US007680991B2

(12) United States Patent  (10) Patent No.: US 7,680,991 B2
Chodacki et al.  (45) Date of Patent: Mar. 16, 2010

(54) CORRELATED ANALYSIS OF WASTED SPACE AND CAPACITY EFFICIENCY IN COMPLEX STORAGE INFRASTRUCTURES

(75) Inventors: Frank Arthur Chodacki, Leander, TX (US); Gregory John Tevis, Tucson, AZ (US); David Gregory Van Hise, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/756,018

(22) Filed: May 31, 2007

(65) Prior Publication Data

US 2008/0301204 A1  Dec. 4, 2008

(51) Int. Cl.
*G06F 12/00* (2006.01)
(52) U.S. Cl. ...................................... 711/154
(58) Field of Classification Search ........................ None
See application file for complete search history.

(56) References Cited

U.S. PATENT DOCUMENTS

| | | | |
|---|---|---|---|
| 6,021,415 A | 2/2000 | Cannon et al. | |
| 6,332,177 B1 | 12/2001 | Humlicek | |
| 7,539,706 B1 * | 5/2009 | Campbell | 707/204 |
| 2002/0129216 A1 * | 9/2002 | Collins | 711/170 |
| 2005/0138050 A1 | 6/2005 | Lightstone et al. | |

* cited by examiner

*Primary Examiner*—Hiep T Nguyen
(74) *Attorney, Agent, or Firm*—Stephen J. Walder, Jr.; Feb R. Cabrasawan

(57) ABSTRACT

A system and method for correlated analysis of wasted space and capacity efficiency in complex storage infrastructures are provided. The system and method of the illustrative embodiments bring together wasted space data from all areas and components of the storage infrastructure into a single set of reports correlating information from these various sources in the storage infrastructure. In addition, correlated analysis of this collected information is performed with regard to wasted space. Logical storage devices of the storage infrastructure which are unused by host systems may be identified and appropriate corrective actions may be automatically taken. Moreover, automated recommendations and other automated corrective actions may be taken based upon the correlated analysis of the correlated data collected from the various components of the storage infrastructure.

20 Claims, 5 Drawing Sheets

CORRELATED ANALYSIS OF WASTED SPACE AND CAPACITY EFFICIENCY IN COMPLEX STORAGE INFRASTRUCTURES

BACKGROUND

1. Technical Field

The present application relates generally to an improved data processing system and method. More specifically, the present application is directed to a system and method for correlated analysis of wasted space and capacity efficiency in complex storage infrastructures.

2. Description of Related Art

Enterprise Storage Resource Management (SRM) solutions have emerged to assist storage administrators with the overwhelming operational tasks of managing today's complex storage environments. One area of great concern to companies is capacity management of the storage infrastructure. Capacity management includes discovering, monitoring, reporting, planning, and provisioning of storage resources in order to guarantee necessary storage resources are available for on-going business operations. However, known SRM solutions are not as efficient as would be desired at providing such capacity management functionality.

Known SRM capacity management mechanisms provide extensive reporting and monitoring capabilities across various components of the storage infrastructure. Reporting capabilities include measurements of total, used, and free storage capacities. Historical views of these values may be typically reported as well as future trending reports. Moreover, reporting capabilities of known SRM capacity management mechanisms also support monitoring of some or all of these values for comparison to utilization thresholds such that events may be triggered, notifications may be sent, or, in more advanced solutions, automated actions may be performed. While SRM solutions have been evolving for several years, actual full scale deployment of SRM solutions in large, heterogeneous, distributed enterprises is a much more recent occurrence. These large scale deployments are revealing the limitations of existing SRM solutions.

The majority of known SRM systems require separate SRM tools for each component of the storage infrastructure, e.g., one tool for host server based capacity planning, another tool for network capacity planning, and others for storage subsystem capacity management, etc. As a result, reporting of information is provided in a separate manner and a storage administrator must access multiple reports and attempt to correlate the information himself/herself to obtain an overall view of the storage system situation.

In the most modern SRM systems, a single tool is used to perform capacity reporting and monitoring for all of the storage infrastructure components of a complex storage infrastructure, i.e. applications, file systems, databases, volumes, host based volume managers, networks, storage networks, disk storage subsystems, and tape storage subsystems. In addition, modern SRM systems have started to move past data collection, reporting and monitoring, into analysis of the data. However, while a single tool is provided, the reporting and management aspects are still separated for each storage infrastructure component.

Moreover, some SRM tools also support automated actions based on certain storage capacity events, e.g., a file system or database running out of space. However, the automated actions performed by known SRM tools are event-based and thus, are only performed in a reactionary manner once a predetermined event has occurred. That is, once a condition of a storage infrastructure component exceeds a threshold, i.e. the event occurs, only then will an automated action be performed based on the detected condition. There is no ability to proactively perform automated actions to avoid such events.

Despite the evolution of SRM solutions described above, storage capacity management today continues to be inefficient, this inefficiency being driven by the high growth rates of file and database data. In addition, while now available through a single tool, capacity reports are still typically segregated by components of the storage infrastructure, offering storage administrators raw data that is largely unusable. Furthermore, many storage provisioning and management tasks are manual and thus, consume a large amount of time that results in information technology that is not as responsive to the needs of businesses as desired. Thus, while storage capacity management solutions are evolving, they are not keeping pace with data growth and management requirements. As a result, storage administrators spend a tremendous amount of time performing manual capacity management tasks. These factors result in a situation where information technology resources, such as servers, storage subsystems, and networks, remain underutilized and inefficiently managed while people resources are over-utilized.

SUMMARY

The illustrative embodiments provide a system and method for correlated analysis of wasted space and capacity efficiency in complex storage infrastructures. The system and method of the illustrative embodiments bring together wasted space data from all areas and components of the storage infrastructure into a single set of reports correlating information from these various sources in the storage infrastructure. In addition, correlated analysis of this collected information is performed with regard to wasted space. Logical storage devices of the storage infrastructure which are unused by host systems may be identified and appropriate corrective actions may be automatically taken. Moreover, automated recommendations and other automated corrective actions may be taken based upon the correlated analysis of the correlated data collected from the various components of the storage infrastructure.

With the mechanisms of the illustrative embodiments, a storage management module is provided that communicates with, and directs the operations of, a plurality of heterogeneous storage area network (SAN) components within a storage infrastructure. The storage management module utilizes agents that gather capacity and utilization data from a plurality of SAN components including applications, file systems, operating systems, databases, networking devices, storage subsystems, storage volumes, and the like. Data is gathered from the entire storage infrastructure, e.g., from all host systems using storage on the subsystems which are part of the storage infrastructure being monitored.

In one illustrative embodiment, this data gathered from the various SAN components is compiled together into a single representation data structure referred to herein as the "wasted space pyramid" data structure. The wasted space pyramid data structure, and its graphical representation, represents the correlation and consolidation of wasted space data from the plurality of SAN components in a complex storage infrastructure. The wasted space pyramid provides new capabilities, compared to existing systems, by displaying the complex set of data from the various SAN components in a single view. Thus, this wasted space pyramid provides storage administrators with a new view and new insight into capacity inefficiencies in their storage environments.

Each level of the wasted space pyramid shows the esoteric capacity reporting that is done for each component or level of the storage infrastructure. Moreover, the wasted space pyramid provides an indication of the amount of storage wasted at each level in one view. This representation is further enhanced visually by showing proportionate sized and colored areas for wasted space at each level. As a result, the wasted space pyramid provides a view of inefficiencies and quickly reveals to a storage administrator any capacity wastage trouble spots across the storage infrastructure.

While the correlation and consolidation of the data from the various SAN components into a single wasted space pyramid data structure and representation in itself provides some initial wasted space analysis simply by bringing together formerly disconnected metrics into a single view, additional correlated analysis of host system collected information and storage subsystem information may be performed utilizing the mechanisms of the illustrative embodiments. Various such correlated analysis is described herein that otherwise is not performed by known systems of capacity management.

In one illustrative embodiment, a method for monitoring storage capacity utilization is provided. The method may comprise collecting metric data from a plurality of agents associated with a plurality of storage area network elements, consolidating the metric data into a single representation of storage capacity utilization and waste across the entire storage area network, and outputting the single representation of storage capacity utilization and waste for use in administering the storage area network. The method may further comprise analyzing the single representation of storage capacity utilization and waste to identify storage waste problems in the storage area network. Moreover, the method may comprise generating and outputting a notification of a storage waste problem in response to the results of analyzing the single representation of storage capacity utilization and waste.

The single representation of storage capacity utilization and waste may comprise a hierarchical representation comprising a plurality of layers. The plurality of layers may correspond to layers of the storage area network. The hierarchical representation may be arranged in a pyramidal configuration in which a first layer, at one extreme of the representation, corresponds to basic raw storage capacity of the storage area network and a second layer, at an opposite extreme of the representation, corresponds to a portion of storage capacity used for logical units which comprises files and database data and a portion that is not used by files or database data.

A third layer, adjacent the first layer, of the hierarchical representation may correspond to a formatted/unformatted storage capacity portion of the basic raw storage capacity of the first layer. A comparison of the first layer to the third layer may identify an amount of wasted storage capacity due to unformatted storage capacity being present in the storage area network.

A fourth layer, adjacent the third layer, of the hierarchical representation may correspond to a portion of the formatted storage capacity in the third layer that is allocated to logical units and a portion of the formatted capacity in the third layer that is unallocated to logical units is represented. A comparison of the fourth layer to the third layer may identify an amount of wasted storage capacity due to formatted capacity not being allocated to logical units.

A fifth layer, adjacent the fourth layer, of the hierarchical representation may correspond to a portion of the formatted storage capacity allocated to logical units in the fourth layer, which is actually assigned to logical units and a portion of the formatted storage capacity which are unassigned to logical units. A comparison of the fifth layer to the fourth layer may identify an amount of wasted storage capacity due to the formatted storage capacity allocated to logical units being unassigned to logical units.

A sixth layer, adjacent the fifth layer, of the hierarchical representation may correspond to a portion of storage capacity of assigned logical units that is actually assigned to operating systems and a portion of the storage capacity of the assigned logical units that is not assigned to the operating systems. A comparison of the sixth level with the fifth level may identify an amount of storage capacity assigned to logical units that is wasted storage capacity due to the storage capacity not being assigned to the operating systems.

A seventh layer, adjacent the sixth layer, of the hierarchical representation may correspond to a portion of the logical unit storage capacity, assigned to an operating system, which is used for logical partitions in a storage subsystem and a portion of unused Physical Partitions (PPs) and unused hard disks. A comparison of the seventh layer to the sixth layer may identify an amount of wasted storage capacity due to unused PPs and unused hard disks.

The metric data may be gathered from a plurality of storage area network components including at least one of applications, file systems, operating systems, databases, networking devices, storage subsystems, or storage volumes. The plurality of layers of the hierarchical representation may be represented using a proportional sizing and emphasis of wasted storage capacity in the representation.

Analyzing the single representation of storage capacity utilization and waste to identify storage waste problems in the storage area network may comprise analyzing the single representation of storage capacity utilization for a formatted wasted space condition in which storage subsystem volumes have been formatted at the storage subsystem level and assigned to at least one host system, but are not allocated by an operating system on the at least one host system. Analyzing the single representation of storage capacity utilization and waste for the formatted wasted space condition may comprise generating a ratio of an amount of logical unit storage capacity not allocated by the operating system on the at least one host system to an amount of storage capacity allocated by the operating system. Moreover, analyzing the single representation of storage capacity utilization and waste for the formatted wasted space condition further may comprise at least one of determining a number of the at least one host system on which there are assigned volumes that are not allocated by the operating system of the at least one host system or determining a total amount of assigned and unused logical unit storage capacity that exists for all of the at least one host system.

Generating and outputting the notification of the storage waste problem may be performed in response to a measure of the formatted wasted space condition being greater than a predetermined threshold. Analyzing the single representation of the storage capacity utilization and waste further may comprise determining a correlated capacity efficiency rating for the storage area network.

The method may further comprise monitoring the storage area network for a new storage assignment operation in a storage subsystem of the storage area network and monitoring at least one host system of the storage area network for performance of an allocation operation within a predetermined period of time from the new storage assignment operation. The method may also comprise performing, in response to determining that the allocation operation is not performed within the predetermined period of time, at least one of generating a notification or automatically initiating the allocation operation of the at least one host system.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The data processing system may comprise a storage management module and a plurality of agents, associated with a plurality of storage area network elements, and coupled to the storage management module. The storage management module may perform various ones, and combinations of, the operations outlined above with regard to the method illustrative embodiment based on metric information obtained from the plurality of agents.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1A:
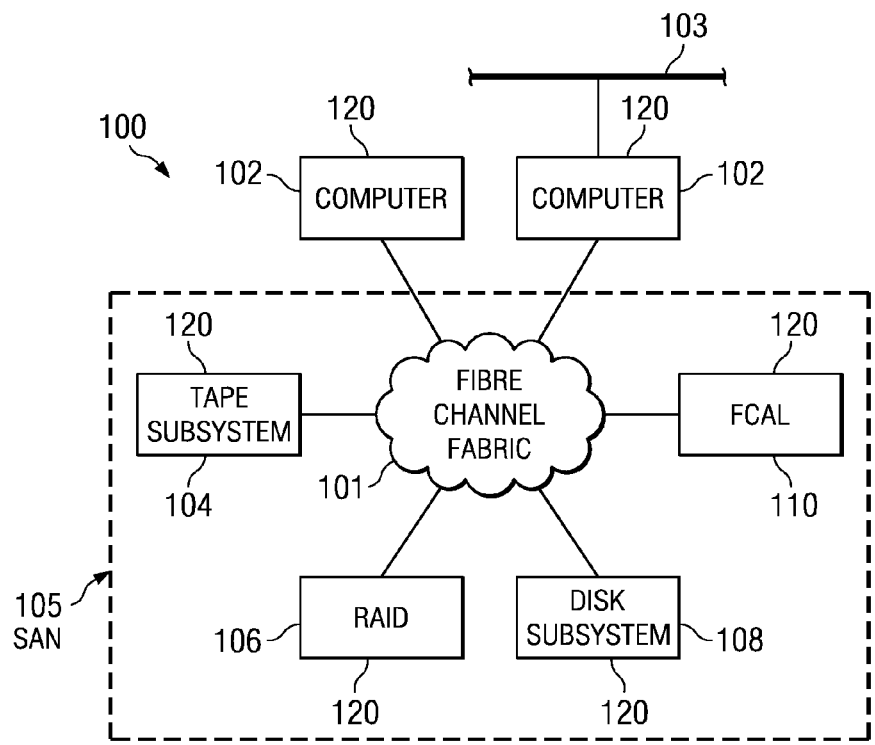
FIGS. 1A and 1B are exemplary representations of an exemplary distributed data processing system in which aspects of the illustrative embodiments may be implemented.
Figure 2:
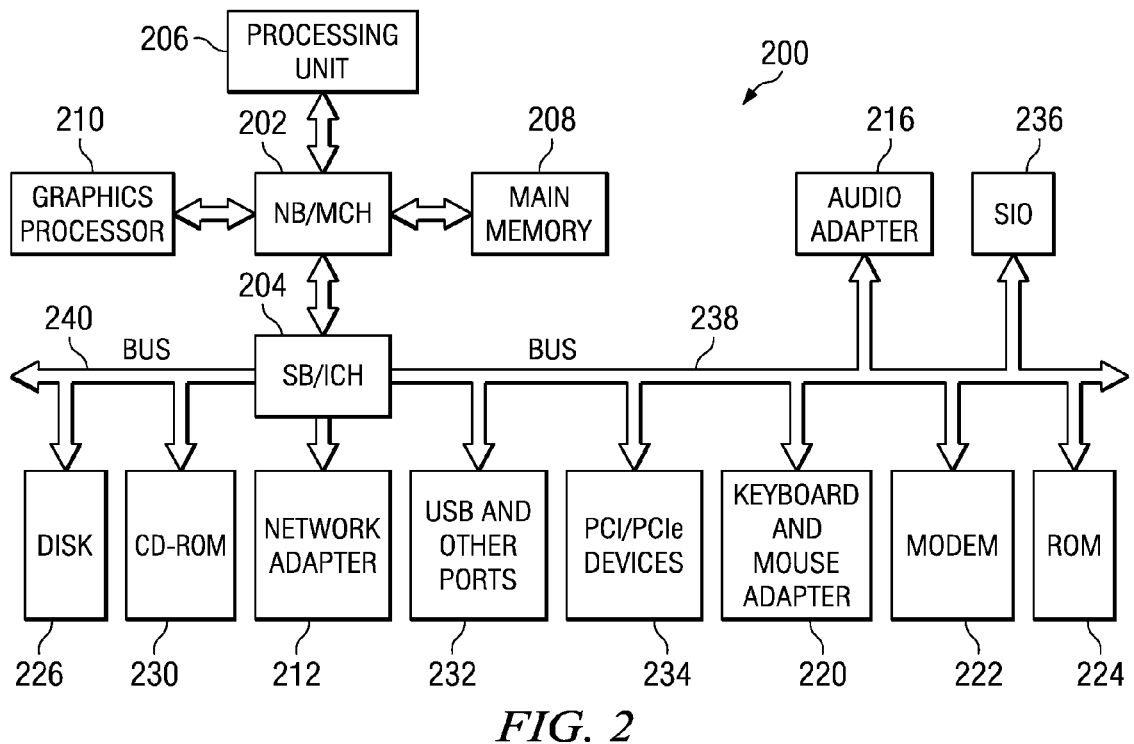
FIG. 2 is a block diagram of an exemplary data processing system in which aspects of the illustrative embodiments may be implemented.

The illustrative embodiments provide a system and method for correlated analysis of wasted space and capacity efficiency in complex storage infrastructures. As such, the illustrative embodiments are especially well suited for implementation and use in a distributed data processing environment in which one or more data processing devices and/or storage systems/devices are in communication with one another via one or more data networks. In order to provide a context for discussion of the particular elements of the illustrative embodiments, FIGS. 1A-2 hereafter are provided as examples of a distributed data processing environment and data processing device in which exemplary aspects of the illustrative embodiments may be implemented. It should be appreciated that FIGS. 1A-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, one embodiment of a data processing network 100 suitable for implementing the illustrative embodiments is depicted. Network 100 includes a storage area network (SAN) 105 that, in the depicted example, is a Fibre Channel compliant SAN. Fibre Channel is a scalable technology data transfer interface technology that maps several common transport protocols, including Internet Protocol (IP) and Small Computer System Interface (SCSI), allowing it to merge high-speed input/output (I/O) and networking functionality in a single connectivity technology. Fibre Channel is a set of open standards defined by the American National Standards Institute (ANSI) and the International Organization for Standardization (ISO). Detailed information regarding the various Fibre Channel standards is available from ANSI Accredited Standards Committee (ASC) X3T11 (www.t11.org), which is primarily responsible for the Fibre Channel project. These standards are collectively referred to in this specification as the Fibre Channel standard or the Fibre Channel specification. Fibre Channel operates over both copper and fiber optic cabling at distances of up to 10 Kilometers and supports multiple inter-operable topologies including point-to-point, arbitrated-loop, and switching (and combinations thereof).

It should be appreciated that while the illustrative embodiments will be described in terms of using Fibre Channel and a Fibre Channel fabric, the illustrative embodiments are not limited to such. Rather, any interface technology, communication suite, or communication protocol may be utilized with the mechanisms of the illustrative embodiments without departing from the spirit and scope of the present invention. Fibre Channel is only used as an example and is not intended to state or imply any limitation with regard to the types of communication connections or protocols that may be used with the mechanisms of the illustrative embodiments.

The depicted embodiment of SAN 105 includes a set of nodes 120 that are interconnected through a Fibre Channel fabric 101. The nodes 120 of network 100 may include any of a variety of devices or systems including, as shown in FIG. 1A, one or more data processing systems (computers) 102, tape subsystem 104, RAID device 106, disk subsystem 108, Fibre Channel arbitrated loop (FCAL) 110, and other suitable data storage and data processing devices. One or more nodes 120 of network 100 may be connected to an external network denoted by reference numeral 103. The external network 103 may be a local area network (LAN), a wide area network (WAN), or the like. For example, the external network 103 may be an Internet Protocol (IP) supported network, such as the Internet.

Figure 1B:
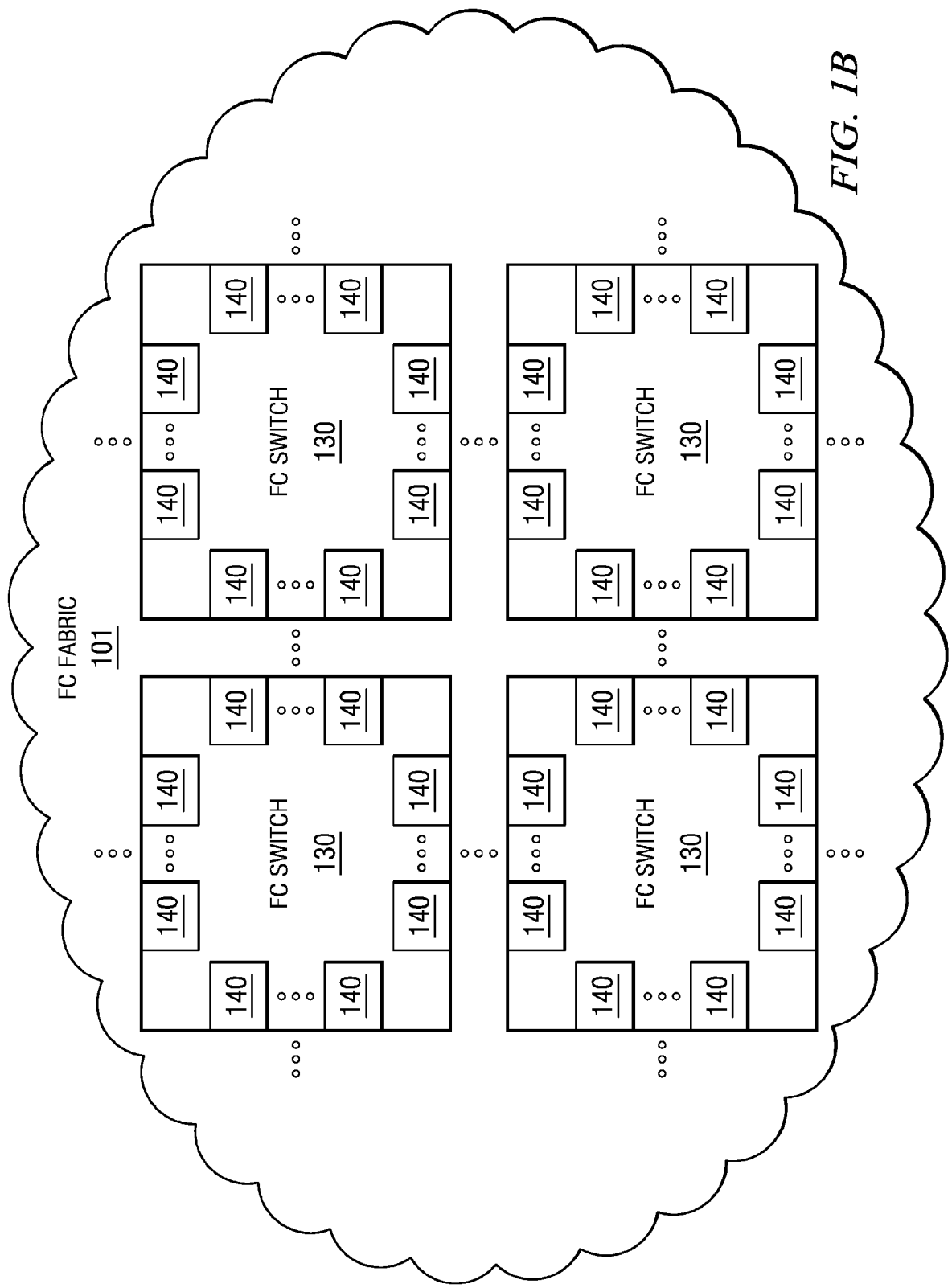

Typically, Fibre Channel (FC) fabric 101 includes one of more interconnected Fibre Channel (FC) switches 130, as shown in FIG. 1B, each of which includes a set of Fibre Channel ports 140. Each port 140 typically includes a connector, a transmitter, a receiver, and supporting logic for one end of a Fibre Channel link and may further include a controller. Ports 140 act as repeaters for all other ports 140 in Fibre Channel fabric 101. Fibre channel ports are described according to their topology type. An F port denotes a switch port (such as are shown in FIG. 1B), an L or NL port denotes an Arbitrated-Loop link (not shown in FIG. 1B), and an FL port denotes an Arbitrated-Loop to Switch connection port. The ports 140 communicate in a standardized manner that is independent of their topology type, allowing Fibre Channel to support inter-topology communication.

With reference now to FIG. 2, a block diagram of an exemplary data processing system is shown in which aspects of the illustrative embodiments may be implemented. Data processing system 200 is an example of a computer, such as computer 102 in FIG. 1A, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, network adapter 212 connects to SB/ICH 204. The network adapter 212, in one illustrative embodiment, may be a Fibre Channel host bus adapter (HBA) or other network adapter, such as a local area network (LAN) adapter, or the like.

Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1A-2 may vary depending on the implementation. Other internal hardware or peripheral devices, such as flash memory, equivalent non-volatile memory, or optical disk drives and the like, may be used in addition to or in place of the hardware depicted in FIGS. 1A-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a system and method for correlated analysis of wasted space and capacity efficiency in complex storage infrastructures. The system and method of the illustrative embodiments bring together wasted space data from all areas and components of the storage infrastructure into a single set of reports correlating information from these various sources in the storage infrastructure. In addition, correlated analysis of this collected information is performed with regard to wasted space. Logical storage devices of the storage infrastructure which are unused by host systems may be identified and appropriate corrective actions may be automatically taken. Moreover, automated recommendations and other automated corrective actions may be taken based upon the correlated analysis of the correlated data collected from the various components of the storage infrastructure.

With the mechanisms of the illustrative embodiments, a storage management module, which may be provided as part of a computer system 102 in FIG. 1A or a separate computing system, server, or the like, is provided that communicates with, and directs the operations of, a plurality of heterogeneous storage area network (SAN) components within a storage infrastructure. The storage management module utilizes agents, such as may be provided in subsystems 104, 106, 108, and 110, for example, which gather capacity and utilization data from a plurality of SAN components including applications, file systems, operating systems, databases, networking devices, storage subsystems, storage volumes, and the like. Data is gathered from the entire storage infrastructure, e.g., from all host systems using storage on the subsystems which are part of the storage infrastructure being monitored.

In one illustrative embodiment, this data gathered from the various SAN components is compiled together into a single representation data structure referred to herein as the "wasted space pyramid" data structure. The wasted space pyramid data structure, and its graphical representation, represents the correlation and consolidation of wasted space data from the plurality of SAN components in a complex storage infrastructure. The wasted space pyramid provides new capabilities, compared to existing systems, by displaying the complex set of data from the various SAN components in a single view. Thus, this wasted space pyramid provides storage administrators with a new view and new insight into capacity inefficiencies in their storage environments.

Each level of the wasted space pyramid shows the esoteric capacity reporting that is done for each component or level of the storage infrastructure. Moreover, the wasted space pyramid provides an indication of the amount of storage wasted at each level in one view. This representation is further enhanced visually by showing proportionate sized and colored areas for wasted space at each level. As a result, the wasted space pyramid provides a view of inefficiencies and quickly reveals to a storage administrator any capacity wastage trouble spots across the storage infrastructure.

While the correlation and consolidation of the data from the various SAN components into a single wasted space pyramid data structure and representation in itself provides some initial wasted space analysis simply by bringing together formerly disconnected metrics into a single view, additional correlated analysis of host system collected information and storage subsystem information may be performed utilizing the mechanisms of the illustrative embodiments. Various such correlated analysis is described herein that otherwise is not performed by known systems of capacity management.

Figure 3:
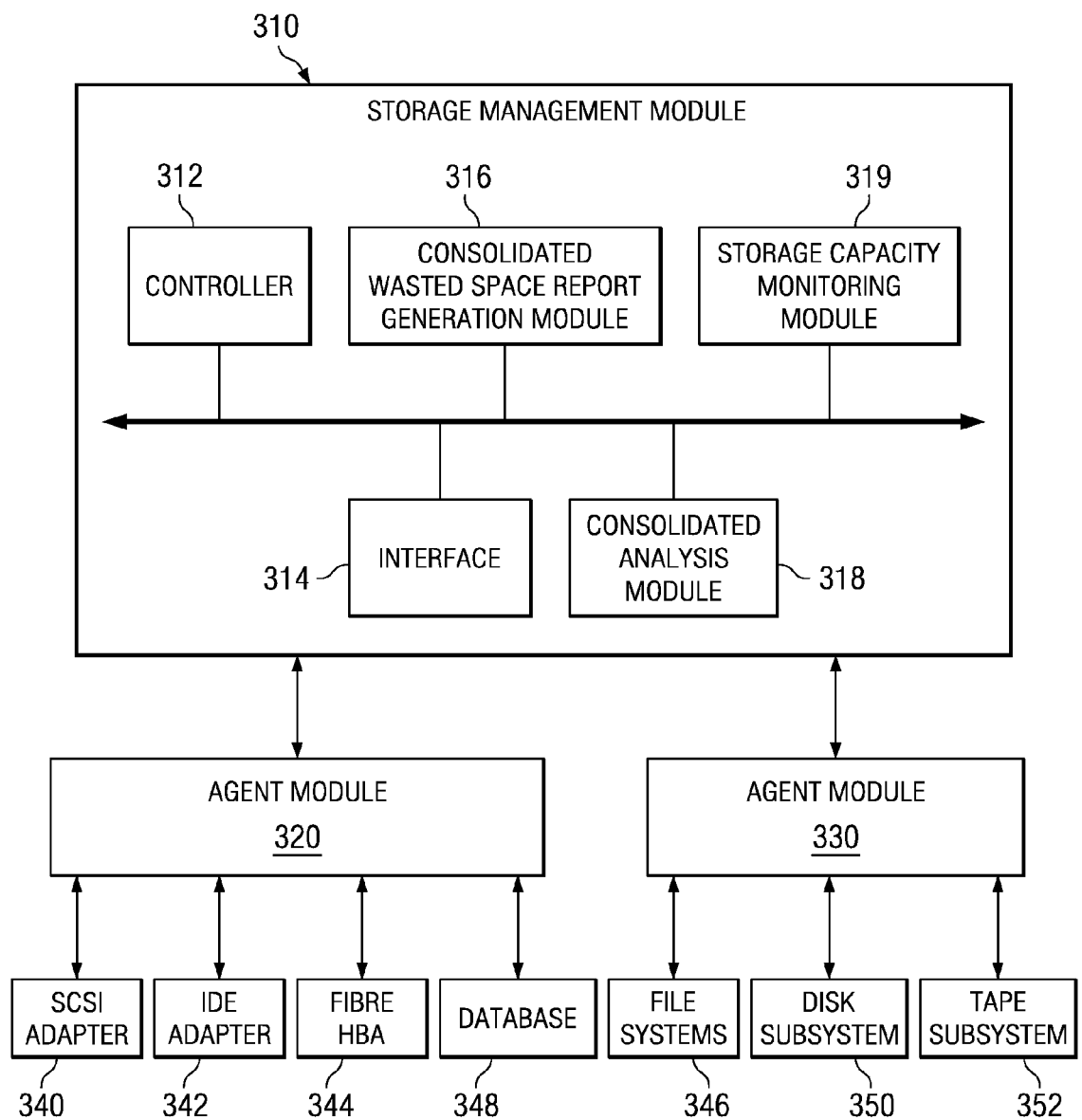
FIG. 3 is an exemplary block diagram illustrating the primary operational components of one illustrative embodiment.

FIG. 3 is an exemplary block diagram illustrating the primary operational components of one illustrative embodiment. As shown in FIG. 3, the primary operational components comprise a storage management module 310 and one or more agent modules 320-330. In one illustrative embodiment, the storage management module 310 may be provided, for example, in a server data processing device while the agent modules 320-330 are provided in one or more SAN devices, such as a host system, storage system, or the like. The storage management module 310 and agent modules 320-330 may be provided as software, hardware, or any combination of software and hardware, in the server data processing device and/or SAN devices.

In one exemplary embodiment, the storage management module 310 is a modified IBM Totalstorage Productivity Center (TPC) system which is modified to incorporate the mechanisms of the illustrative embodiments, as described hereafter. Similarly, the agent modules 320-330 may be agents utilized by the IBM TPC system.

The agent modules 320-330 collect metric information for one or more SAN device resources 340-352 regarding storage capacity, storage usage, and the like. For example, the SAN device resources may include a SCSI adapter 340, an IDE adapter 342, a Fibre Channel Host Bus Adapter (HBA) 344, a file system 346, a database 348, a disk subsystem 350, and/or a tape subsystem 352. The agent modules 320-330 operate in a manner generally known in the art to collect the various metric information and report it back to a central location, which in the depicted example of the illustrative embodiments is the storage management module 310.

In prior art systems, the metric information obtained from the agent modules 320-330 is maintained separately in the storage management module 310. Moreover, the metric information is reported in separate, disjointed reports that are specific to the particular SAN devices and SAN device resources monitored by the agent modules 320-330. With the mechanisms of the illustrative embodiments, the storage management module 310 is able to consolidate and correlate storage capacity and utilization information from the various agent modules 320-330 regarding the various SAN devices and SAN device resources across the SAN into a single consolidated and correlated report that provides additional insight into the state of the SAN such that prediction of SAN conditions may be performed and proactive and preemptory operations may be performed to avoid problems with the SAN resources.

The metric information obtained by the agent modules 320-330, and reported back to the storage management module 310, may comprise a plurality of different measured characteristics of a plurality of different SAN device resources. Such measured characteristics may include used logical volume capacity, unused logical volume capacity, used Physical Partitions (PPs), assigned capacity, capacity used by flat files, file system/logical volume, unused database space, formatted capacity, unassigned capacity, formatted capacity not in logical unit numbers (LUNs), LUN capacity as seen by the operating system (OS), unused PPs, unused hard disks, LUN capacity not seen by the OS, assigned capacity lost to operating system overhead, raw capacity lost to Redundant Array of Independent Disks (RAID) format, unformatted capacity, raw capacity of storage subsystem, unused file system space, chunked capacity (formatted capacity in LUNs), etc. Other measured characteristics may be included in this consolidated reporting and analysis without departing from the spirit and scope of the present invention. Each of these measured characteristics may be obtained from agent modules 320-330 in a manner generally known in the art. Such manners include, but are not limited to, the Simple Networking Management Protocol (SNMP), the T11 Fibre Channel—Methodologies for Interconnects (FC-MI and FC-MI 2) standards, Storage Networking Industry Association (SNIA) Storage Management Initiative Specification (SMIS), Small Computer System Interface (SCSI) commands, SCSI Extended Link Services (ELS), as well as commonly used vendor specific interfaces.

Table 1 is an exemplary table illustrating these measured characteristics and the corresponding data report in which the measured characteristic is provided in accordance with one illustrative embodiment. It should be appreciated that some of the measured characteristics represented in Table 1 which do not require consolidated analysis and calculation to generate, may be obtained using known agents while other measured characteristics, such as entries D, I, M, and N in Table 1, for example, are only obtainable through the consolidated analysis and calculation provided by the mechanisms of the illustrative embodiments.

As can be seen from Table 1, the measured characteristic information is generally provided separately from separate agents, is maintained separately, and is reported in separate reports such that the information is not correlated and consolidated in a meaningful way. The mechanisms of the illustrative embodiments, consolidate and correlate this information into a single hierarchical representation of the storage capacity and utilization state of the SAN devices and SAN device resources. Moreover, the mechanisms of the illustrative embodiments provide a consolidated analysis of the consolidated and correlated information to provide greater insight into the condition of the SAN and a predicted condition of the SAN so as to perform preemptive actions to avoid an unwanted storage capacity situation.

TABLE 1

Storage Capacity Metric and Corresponding Storage Management Module Report

| Measurement Metric | Data Report from which Metrics may be Extracted |
| --- | --- |
| (A) Used Logical Volume Capacity | Logical Volume Capacity - Capacity Reporting->Asset->System Wide->File Systems or Logical Volumes->By Freespace: Capacity (for file systems on logical volumes) Reporting->Asset->System Wide->File Systems or Logical Volumes->Logical Volumes Without File systems: Logical Volume Capacity |
| (B) Unused Logical Volume Capacity | Logical Volume Capacity - Capacity Reporting->Asset->System Wide->File Systems or Logical Volumes->By Freespace: Logical Volume Capacity, Capacity (FS capacity) |
| (C) Used Physical Partitions | Capacity - Free Space Reporting->Asset->System Wide->Disk/Volume Groups->By Free Space: Free Space, Capacity |
| (D) Assigned Capacity | Reporting->Capacity->Disk Capacity->By Storage Subsystem: ASSIGNED LUN Capacity Visible to Data Manager ESS Assigned Capacity that is not managed by SVC: Reporting-> Asset->Storage Subsystem-> LUN to HBA Storage Subsystems: LUN Capacity (filter out ESS LUNs assigned directly to SVC - HBA Port WWN < > 5005*) SVC Assigned Capacity: Reporting->Asset->System Wide-> LUNs: Capacity (filter sub system = SVC and SURFACED = yes) EMC Assigned Capacity: Reporting->Storage Subsystem-> Storage Subsystem-By LUN: LUN Capacity (filter on Storage Subsystem = EMC and Computer < > 000*) |
| (E) Capacity Used by Flat Files File System/ Logical Volume | Reporting->Storage Subsystem Views->Computer Views->By File system/Logical Volume: Capacity |
| (G) Unused Database Space | Databases->System Reports->All Dbms->Database Storage By Computer: File Free space Oracle: Databases->System Reports->Oracle - Total Database Freespace: FreeSpace UDB: Databases->System Reports->UDB - Total DMS Container Freespace: FreeSpace MS SQL Server: Databases->System Reports->SqlServer - Total Database Freespace: DataFreeSpace + LogFreeSpace Sybase: Databases->System Reports->Sybase - Total Database Freespace: DataFreeSpace |
| (H) Formatted Capacity | Reporting->Capacity->Disk Capacity->By Storage Subsystem: Formatted Capacity (ESS) Reporting->Capacity->Disk Capacity->By Storage Subsystem: LUN Capacity (EMC) |
| (I) Unassigned Capacity | I1 + I2 + I3 + I4a − I4b I 1 Reporting->Asset->System Wide->LUNS->By Capacity: CAPACITY (filter Surfaced = No and only SVC) I2 Reporting->Asset->System Wide->Storage Subsystems: UNASSIGNED LUN Capacity (ESS Only) I3 Reporting->Asset->System Wide->Storage Subsystems: Disk Unallocated Space (Filter out non-SVC) I4a Reporting->Asset->System Wide->Storage Subsystems: LUN Capacity (EMC Only) I4b Asset->System Wide->LUNS->By Capacity: CAPACITY (filter storage subsystem = EMC and replication = source) |
| (J) Formatted Capacity Not in LUNs | Reporting->Asset-System Wide->Storage Subsystem: Formatted Space with no Volumes (filter out SVC) |
| (K) LUN Capacity as seen by OS | Reporting->Storage Subsystems->Storage Subsystem Views-> By LUN: LUN Capacity (filter comp < > 000) Surfaced = YES |
| (L) Unused Physical Partitions | Reporting->Asset->System Wide->Disk/Volume Groups->By Free Space: Free Space |
| (M) Unused Hdisks | Reporting->Storage Subsystems->Storage Subsystem Views-> By LUN = LUN Capacity, Allocated LUN Space, Unallocated LUN Space (Allocated LUN Space = 0) & (LUN Capacity ^= 0) & (LUN Capacity = Unallocated LUN Space) |
| (N) LUN Capacity Not Seen by OS | N = D − K |
| (O) Assigned Capacity Lost to Operating System Overhead | Reporting->Capacity->File System Used Space->By File system This includes storage spent on Operating System overhead such as file system maintenance (e.g., inode tracking), OS system volumes, etc. |
| (P) Raw Capacity Lost to RAID 5 Format | Reporting->Capacity->Disk Capacity->By Storage Subsystem: Overhead |
| (Q) Unformatted Capacity | Reporting: Reporting->Asset->System Wide->Storage Subsystems: Unformatted Disk Group Capacity |
| (R) Raw Capacity of Storage Subsystem | Reporting->Capacity->Disk Capacity->By Storage Subsystem: Disk Capacity |

TABLE 1-continued

Storage Capacity Metric and Corresponding Storage Management Module Report

| Measurement Metric | Data Report from which Metrics may be Extracted |
| --- | --- |
| (S) Unused File system Space | Reporting->Storage Subsystem Views->Computer Views->By File system/Logical Volume: Free Space |
| (T) Chunked Capacity - Formatted Capacity in LUN's | Reporting->Asset->System Wide-Storage Subsystem->By Storage Subsystem: LUN Capacity (filter out SVC) |

As shown in FIG. 3, the storage management module 310 includes a controller 312, an interface 314, a consolidated wasted space report generation module 316, a consolidated analysis module 318, and a storage capacity monitoring module 319. The controller 312 controls the overall operation of the storage management module 310 and orchestrates the operation of the other components 314-319. The interface 314 provides a communication pathway through which data may be exchanged with the agent modules 320-330 via one or more networks of a complex heterogeneous SAN environment, such as the Fibre Channel fabric 101 in FIG. 1A, or the like. The consolidated wasted space report generation module 316 consolidates and correlates the storage capacity and utilization information from the various agent modules 320-330 into a single report, referred to herein as the wasted space pyramid. The consolidated analysis module 318 performs analysis on the consolidated storage capacity and utilization information to thereby provide additional predictive information regarding a future state of the SAN such that corrective actions may be taken to avoid unwanted conditions of the SAN device resources.

The storage capacity monitoring module 319 monitors the allocation of storage space to host systems of the SAN environment to ensure that the storage space assigned by the storage subsystems to host systems is not wasted by the host systems not defining and allocating the assigned storage, as will be described in greater detail hereafter. The storage capacity monitoring module 319 may further send notifications to host systems that are not defining and allocating their assigned storage properly. The storage capacity monitoring module 319 may operate continuously, periodically, or in response to certain events, and may be controlled by the controller 312. For example, the storage capacity monitoring module 319 may begin operation in response to a determination of a chronic wasted storage space condition being present.

The storage capacity monitoring module 319 may monitor storage subsystem assignment operations to ensure that a corresponding host system allocation operation is performed. If a corresponding host system allocation operation is not performed within a predefined time period of the storage subsystem assignment operation, then detection of potentially wasted storage space is made and an appropriate notification may be generated and sent to the host system. Alternatively, if the host system allocation operation is not performed within the predefined time period, an automated process may be automatically initiated for performing the host system allocation operation so as to ensure that storage space is not wasted due to a lack of allocation by the host system.

Figure 4:
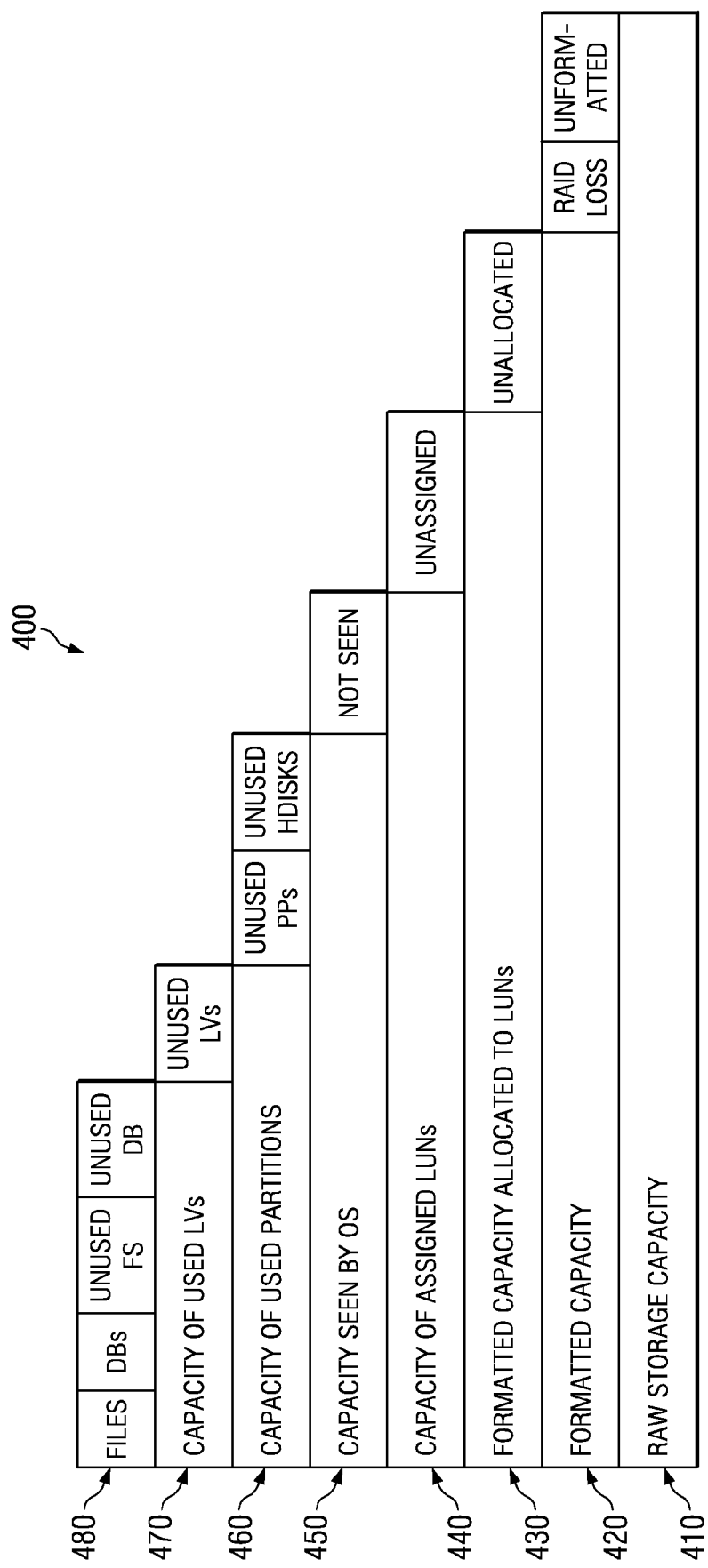
FIG. 4 is an exemplary diagram of a wasted space pyramid data structure and representation in accordance with one illustrative embodiment.

FIG. 4 is an exemplary diagram of a wasted space pyramid data structure and representation in accordance with one illustrative embodiment. The wasted space pyramid data structure represents the correlation and consolidation of wasted space data for complex SAN infrastructures as obtained from agents provided in the SAN. The wasted storage pyramid provides administrators a new view and new insight into capacity inefficiencies in their SAN infrastructures. The information needed to generate the wasted space pyramid data structure and representation may be obtained from the agents and may, in some illustrative embodiments, be extracted from the various reports discussed above with regard to Table 1. Other wasted space data and measured characteristics may be included in this wasted space pyramid data structure and representation without departing from the spirit and scope of the present invention.

As shown in FIG. 4, the wasted space pyramid data structure and representation 400 comprises a plurality of levels corresponding to levels of infrastructure within the SAN. Each level of the pyramid data structure shows the esoteric capacity reporting that is done for each SAN device or level of the SAN infrastructure. The pyramid data structure consolidates the wasted space data from a plurality of sources throughout the SAN infrastructure into a single view or single report, rather than the multitude of separate views and reports generally known in the art.

It should be appreciated that in known systems, the information that is used to generate insights into the SAN status afforded by the wasted space pyramid data structure is typically spread throughout the SAN on various agents that do not communicate with one another. Moreover, no mechanisms are known that consolidate this information from these various locations and perform a consolidated analysis of this information to obtain a consolidated view of the SAN infrastructure such as is depicted in FIG. 4. The mindset up to now with SAN administrators is to look at each separate portion of the information in a separate manner, and in a manual manner, and thus, there has not been a trend to consolidation such as in the present invention. The consolidation of such information and performing consolidated analysis is not a trivial task. For example, just being able to identify databases, file systems, and the logical volumes they use, and which actual physical volumes they correspond to is a non-trivial task. To then represent where/how storage is being wasted at all of these levels and present that information effectively is a further non-trivial task.

The exemplary wasted space pyramid data structure and representation shown in FIG. 4 comprises a first level 410, at a lowest level of the hierarchical wasted space pyramid data structure, representative of the basic raw storage capacity of the SAN infrastructure. At a second level 420, the formatted capacity portion of the raw storage capacity of the SAN infrastructure, the RAID loss, and unformatted storage capacity are represented. Raw disk storage capacity is typically formatted according to a variety of standard configurations including various Redundant Arrays of Inexpensive Disks (RAID) configurations. These RAID configurations often involve a significant reduction in the total usable capacity due to RAID loss or overhead. For example, some RAID approaches include parity storage to allow reconstruction of data in the event of data loss; RAID 1 mirrors data to two disks, basically resulting in a 100% usable storage capacity loss. Unformatted storage capacity is raw storage that is not carved up into usable storage volumes, e.g., extra space left over after allocating fixed blocks of storage into volumes. By looking at the relationship between the first level 410 and second level 420 one can determine what portion of the raw storage capacity of the SAN infrastructure is lost due to RAID loss and portions of the storage subsystems not being formatted.

At the next highest level 430, the portion of the formatted capacity in the second level 420 that is allocated to logical unit numbers (LUNs) and the portion that is unallocated to LUNs is represented. Thus, a comparison of level 430 to level 420 shows how much storage capacity is lost due to formatted capacity not being allocated to LUNs. In level 440, the formatted storage capacity allocated to LUNs which is actually assigned to LUNs and which are unassigned is represented. Thus, a comparison of level 440 with level 430 indicates the portion of the formatted storage capacity allocated to LUNs which is wasted due to it being unassigned to LUNs may be indicated.

At the next highest level 450 in the wasted space pyramid data structure, the portion of the storage capacity of assigned LUNs that is actually seen by the operating systems (OS) and the portion of the storage capacity of the assigned LUNs that is not seen by the OSs are represented. Disk storage LUNs typically need to be assigned to various host operating systems in order to be accessed; this assignment is typically configured on the storage subsystem. If operating systems can not see these assigned LUNs due to network outages, network configuration problems, lack of the operating system reboot required by some OSs to see new LUNs, etc, this storage becomes wasted. Such wasted storage scenarios are very common, but very hard to detect, in today's complex storage infrastructures. Thus, by a comparison of the level 450 with the level 440 in the wasted space pyramid data structure, one can determine how much of the storage capacity assigned to LUNs is lost due to the storage capacity not being seen by the operating systems.

At the next higher level 460, the portion of the LUN storage capacity seen by the operating system which is used for logical partitions in the storage subsystem is represented along with unused Physical Partitions (PPs) and unused hard disks. A comparison of level 460 with the level 450 provides an indication of an amount of storage capacity seen by the operating system that is lost due to unused PPs and unused hard disks may be identified.

In the next higher level 470, the portion of the capacity used for partitions which is used for logical volumes (LVs) and not used for logical volumes is identified. Storage wastage at this level often occurs within Logical Volume Manager (LVM) software solutions that add a level of virtualization on top of the operating systems and storage subsystems. These LVM solutions typically employ another level of RAID with its associated potential storage loss. These storage losses are included in the "Unused Logical Volumes" category. Thus, from a comparison of level 470 and level 460, the portion of storage capacity that is used by logical volumes, and the portion of storage capacity which is lost or wasted due to logical volume configurations, may be identified.

Finally, in the top most level 480, the portion of the capacity used for logical volumes which comprises files and database data, and the portion that is not used by files or database data, is identified. Thus, a comparison of level 480 with level 470 gives an indication of the portion of storage capacity that is wasted due to it not being used for files or database data. In addition, at level 480, data is also available on the amount of stale data that is consuming files and database storage. Stale data is data that has not been referenced in some policy specified time period, for example, files or database data which has not been referenced in over a year.

Thus, by looking at each of the levels 410-480, and comparing the various levels, insight into the sources of storage capacity wastage across the entire spectrum of the storage hierarchy may be obtained. Moreover, a storage capacity administrator may identify areas where corrective action can be taken to increase storage capacity usage and reduce storage capacity waste. For example, the storage capacity administrator may determine that a large amount of storage capacity is lost due to the storage capacity not being allocated to LUNs. As a result, the storage capacity administrator may take appropriate measures to increase the amount of storage capacity that is allocated to LUNs. Another example of how this storage wastage pyramid can be leveraged is identifying LUNs which have been assigned to operating systems (OS) but can't be seen by those operating systems. This is a fairly common scenario in large storage environments but it is often hard to detect since the person typically responsible for assigning LUNs to a host server (operating system) is usually a different individual in a different department from the individual responsible for configuring the network and/or operating system in order for the OS to see that assigned LUN. Automated actions to help alleviate this scenario will be disclosed herein.

The wasted storage pyramid, or hierarchy, data structure and representation provides some initial wasted space analysis simply by bringing together what were previously disconnected metrics into a consolidated and correlated representation as discussed above. Additional correlated analysis may be performed, such as by consolidated analysis module 318 in FIG. 3, in order to obtain even greater insight into the conditions of the SAN infrastructure and possible actions to be taken to avoid problems with storage capacity in the SAN infrastructure. The consolidated and correlated metrics may be analyzed to identify various storage capacity problems. The following is one example of conditions indicative of a source of wasted space for which the consolidated and correlated metrics may be analyzed. It should be appreciated that the examples hereafter are indicative of only one condition for which the consolidated and correlated metrics may be analyzed however other conditions may be detected through the special analysis of the mechanisms of the illustrative embodiments without departing from the spirit and scope of the present invention.

For example, special analysis and checking may be performed for a very common but usually undetected source of wasted space in many SAN environments. This source of wasted space is the situation where storage subsystem volumes have been formatted (at the subsystem level) and assigned to host systems, but are not recognized or allocated by the operating systems on those host systems, referred to herein as the "formatted wasted space condition". The LUN capacity not seen by the operating system metric in level 450 of the wasted storage pyramid data structure of FIG. 4 provides the basic metric for identifying this situation. That is, if the total capacity not seen by the operating system is greater than zero, then the situation that there is assigned but unused storage is true; otherwise the assigned but unused storage condition is false.

In some SAN environments, a LUN may be assigned/ unassigned to more than one host system during its lifecycle.

An extension to the above determination is to validate that a LUN is not seen by any host system's operating system (versus one operating system) and that the volume is not the target of a copy services operation, e.g., a Flashcopy operation, for backup generation. The mechanisms of the illustrative embodiments provide analysis mechanisms for performing special comparisons of several metrics to see if this "formatted wasted space condition" is present and if this is a serious problem in the SAN environment.

There are a number of mechanisms that may be utilized for determining whether the formatted wasted space condition is present and whether it is a serious problem or not. One such mechanism for identifying the magnitude of the formatted wasted space condition problem described above uses a simple percentage of the LUN capacity not seen by the operating system in level 450, divided by the assigned capacity to host's metric, i.e. the capacity seen by the operating system's metric in level 450. This gives an indication of the prevalence of this formatted wasted space condition as a percentage. Anything over a predetermined threshold, which may be set by a user, set by default, set via an automated mechanism, or the like, indicates a provisioning process inefficiency in the SAN environment.

A notification may be automatically generated by the storage management module and provided to a storage system administrator so that the storage system administrator may investigate possible resolution and prevention actions. Examples of potential resolution actions for resolving this current wasted space condition include correcting zoning in the SAN environment in order to ensure storage subsystem and host bus adapter ports are in the same zone and investigating why a host system is not configured to use the particular LUNs. If the LUNs are not required by the host system, then the LUN may be unassigned. Examples of prevention actions for preventing the problem from reoccurring in the future may involve the storage system administrator evaluating the provisioning process using information gained in performing the resolution actions of the current formatted wasted space condition and making provisioning process changes that include notification to server system administrators when a storage LUN assignment has occurred, automated operating systems reconfigurations to utilize newly assigned storage LUNs, and the like.

The following is an example of pseudocode which may be executed by the consolidated analysis module 318 to achieve the mechanism described above for analyzing the consolidated SAN storage capacity information. This pseudocode may be run for each of the host systems in the SAN environment so as to obtain consolidated metric information for each host system.

```
If Total_LUN_Capacity_Not_Seen_by_Operating_Systems > 0
        Assigned_But_Unused_Storage_Condition = True;
Else
        Assigned_But_Unused_Storage_Condition = False;
Percentage_of_Assigned_Capacity_Unused =
(Total_LUN_Capacity_Not_Seen_by_Operating_Systems/
Total_Assigned_Capacity_to_Hosts)*100;
If Total_LUN_Capacity_Not_Seen_by_Operating_Systems > 0
        Assigned_But_Unused_Storage_Condition = True;
/*Indicates corrective action is necessary to reclaim space*/
If Percentage_of_Assigned_Capacity_Unused >
Percentage_Unused_Threshold
/* looks like a chronic wasted space problem that requires storage
provisioning process analysis */
        Initiate_Notification_and_Recommendation_to_Evaluate_Provisioning;
End.
```

In a further exemplary analysis mechanism, the magnitude of the formatted wasted space condition problem described above may comprise determining the number of host systems on which there are assigned volumes that are not recognized or allocated by the operating systems on those host systems. This mechanism correlates the analysis across the entire SAN environment to determine how persuasive the capacity inefficiencies are, e.g., is the wasted space condition an isolated incident or ubiquitous? This may be determined by adding up the number of host systems for which the LUN capacity not seen by the operating system value is greater than zero. If this number of host systems is greater than a predetermined threshold, either set by a user, set as a default, set in an automatic manner, or the like, then a chronic wasted space problem may be detected. A notification and recommendation for user evaluation of the provisioning process of the SAN environment may be automatically generated and sent to a storage capacity administrator's workstation to thereby notify the administrator of a potential future problem.

Pseudocode for adding to the pseudocode above to determine the magnitude of the formatted wasted space condition based on the number of host systems on which there are assigned volumes that are not recognized or allocated by the operating systems on those host systems may be as follows, for example:

```
For i = 1 to Number_of_Hosts
    If LUN_Capacity_Not_Seen_by_Operating_System[i] > 0 then
        Number_of_Hosts_With_Assigned_But_Unused_Storage_Condition =
    Number_of_Hosts_With_Assigned_But_Unused_Storage_Condition + 1;
        Assigned_But_Unused_Storage_Condition = True;
    End;
```

In addition to the number of host systems having assigned volumes that are not recognized or allocated by the operating systems, the total amount of assigned and unused LUN storage capacity that exists for all of the host systems in the SAN environment may be considered. If the total amount of assigned and unused LUN storage capacity that exists for all of the host systems in the SAN environment is greater than a predetermined threshold, then an appropriate notification for evaluating the provisioning performed in the SAN environment may be automatically generated and sent to a storage capacity administrator.

```
For i = 1 to Number_of_Hosts
    If LUN_Capacity_Not_Seen_by_Operating_System[i] > 0
        Number_of_Hosts_With_Assigned_But_Unused_Storage_Condition =
Number_of_Hosts_With_Assigned_But_Unused_Storage_Condition + 1;
End;
If Total_LUN_Capacity_Not_Seen_by_Operating_Systems > 0 &&
Number_of_Hosts_With_Assigned_But_Unused_Storage_Condition >
Number_Hosts_Wasting_Storage_Threshold
        Assigned_But_Unused_Storage_Condition = True /* Indicates
corrective action is necessary to reclaim space */
If Total_LUN_Capacity_Not_Seen_by_Operating_Systems >
Unused_Threshold &
Initiate_Notification_and_Recommendation_to_Evaluate_Provisioning; /*
Indicates process analysis required */
End;
```

In addition to the above analysis for identifying a formatted wasted space condition problem in the SAN environment, the mechanisms of the illustrative embodiments may further determine a correlated capacity efficiency rating for the SAN infrastructure. This rating portrays how efficiently SAN attached storage capacity is being utilized across an entire SAN infrastructure. There may be a number of metrics analyzed to determine a capacity efficiency rating for SAN infrastructures in accordance with the illustrative embodiments. As one example, the correlated capacity efficiency rating of one illustrative embodiment may be the proportion of storage space that is actually being utilized within file systems and databases to the total usable capacity in the SAN environment. This efficiency rating is accumulated across all distributed host systems, file systems, and databases using the storage subsystem in the SAN environment. This capacity efficiency rating gives a quick assessment of how much of the available storage capacity is actually being used. Pseudocode for calculating such an efficiency rating may be as follows:

```
Correlated_Capacity_Efficiency_Rating =
(Total_FileSystem_Used_Space_on_SAN_Attached_Disk +
Total_Database_Used_Space_on_SAN_Attached_Disk) /
Total_Usable_Formatted_Capacity_on_Disk_Subsystem (based on
total assigned LUN capacity, so that as orphan LUNs are reclaimed, the
denominator decreases and efficiency rating increases)
```

This rating does not use the raw capacity of storage subsystems because different storage subsystem vendors have different architectures, some of which use vastly different amounts of raw storage capacity to create a single volume of usable storage capacity. Thus, using raw storage capacity would skew the efficiency rating to the point of losing its value. The capacity efficiency rating of the illustrative embodiments reflects storage space wasted through non-allocation, reservation, non-assignment (at the storage subsystem and host operating system levels), volume manager overhead, file system overhead, database overhead, file system unused space, and database unused space.

As discussed above, other consolidated analysis of the metric information gathered from the agents, and consolidated/correlated by the storage management module, may be performed without departing from the spirit and scope of the present invention. Such consolidated analysis is not possible in known systems due to the fact that the metric information gathered by known systems is kept disparate and is not consolidated/correlated into a single view of the entire SAN environment. Thus, the illustrative embodiments provide an improvement over known systems by consolidating/correlating metric information gathered by a plurality of agents from SAN devices and resources across the entire SAN environment into a single view and single hierarchical representation of the storage capacity and storage waste within the SAN environment. Having generated such a single consolidated view of the SAN environment, various consolidated SAN analysis operations may be performed on this view and its corresponding data to thereby identify potential problems and sources of waste in the SAN environment in order to take corrective and preemptive actions.

As mentioned above, in addition to the consolidated analysis performed by the mechanisms of the illustrative embodiments, monitoring of storage allocation may be performed, such as by storage capacity monitoring module 319 in FIG. 3. The storage capacity monitoring module 319 may initiate performance of the monitoring of the storage allocation in response to a command from the controller 312. The controller 312 may send such a command periodically, may do so upon initialization, or in response to a detected event or condition within the SAN environment. In one illustrative embodiment, the storage allocation monitoring performed by the storage capacity monitoring module 319 may be initialized upon detection of a serious storage capacity wastage condition, e.g., one or more of the predetermined thresholds discussed above being exceeded.

The storage capacity monitoring module 319 may monitor for new storage assignment operations on storage subsystems as indicated by configuration event alerts from the storage subsystems, by discovery of new LUN assignments on the storage subsystem during normal discovery through the agent modules 320-330, or through other means. And, when such an assignment operation occurs, the storage capacity monitoring module 319 may monitor the host system for performance of an allocation operation within a predetermined period of time. That is, a user specified, default, or automatically set time period may be established in which the host system should perform an allocation of newly assigned storage space to logical volumes used by the host system. If this allocation does not occur within the set time period, then the host system may be wasting assigned storage space by not allocating it to a usable logical volume.

Thus, a notification may be automatically generated and sent to a storage capacity administrator for notifying the administrator of the potential problem. Moreover, a notification may be sent to the host system itself such that the host system may perform operations to automatically, or with the assistance and input of a user or provider of the host system, rectify the situation by allocating the assigned storage space, e.g., automatically or user directed completion of the missing provisioning operations. In this way, a proactive approach to avoiding potential problems is provided so that incomplete storage provisioning operations may be proactively identified and associated notification and/or automated actions may be performed to reduce storage capacity wastage.

Figure 5:
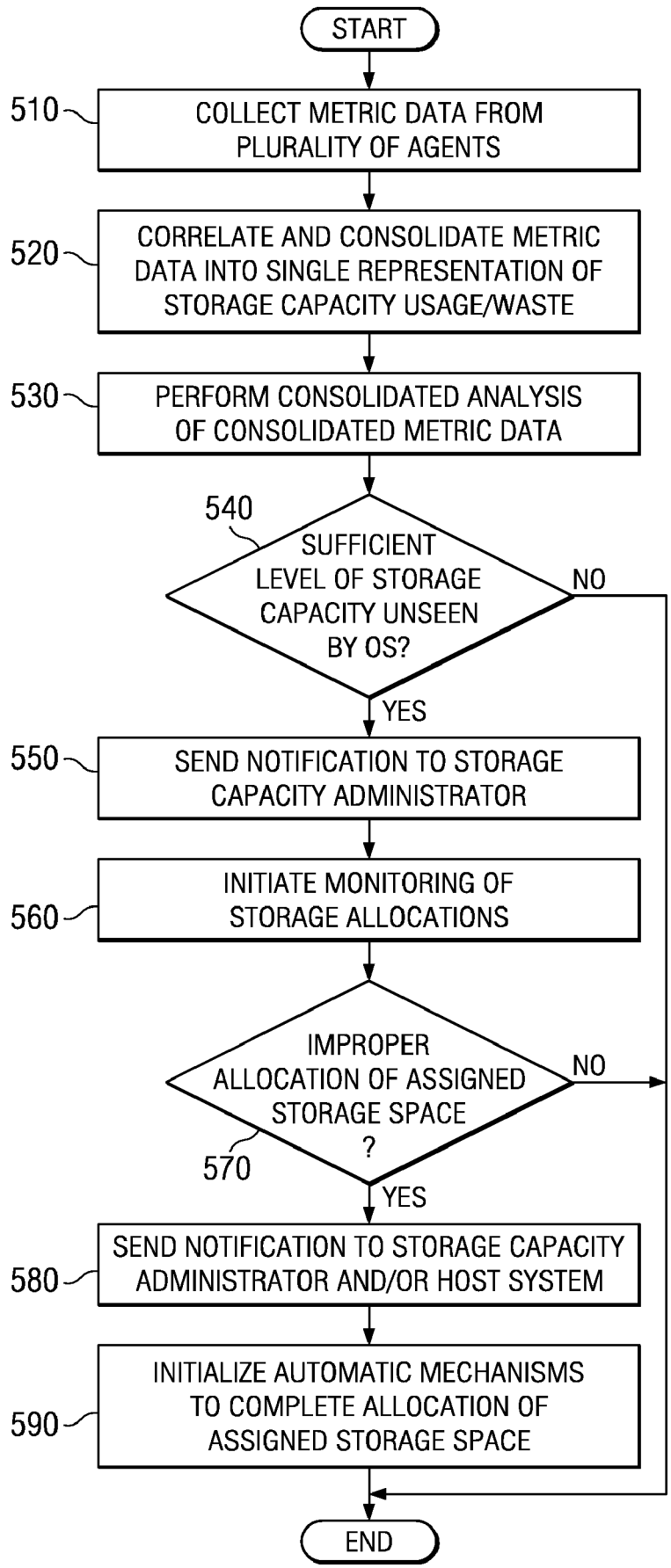
FIG. 5 is a flowchart outlining an exemplary operation for correlating and analyzing storage capacity data from various sources in a complex heterogeneous storage area network in accordance with one illustrative embodiment.

FIG. 5 is a flowchart outlining an exemplary operation for correlating and analyzing storage capacity data from various sources in a complex heterogeneous storage area network in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 5, the operation starts with the storage management module collecting metric data from a plurality of agents providing throughout the SAN infrastructure in association with a plurality of SAN devices and SAN device resources (step 510). The metric data is correlated and consolidated into a single representation of the storage capacity usage and waste (step 520). As discussed above, this single representation may be a wasted storage capacity pyramid or hierarchical representation of the storage capacity usage and waste.

The storage management module performs special consolidated analysis of the consolidated metric data based on the single representation of the wasted storage capacity to determine a level of formatted storage capacity that is unseen by the operating systems of the host systems in the SAN infrastructure (step 530). The storage management module determines whether a sufficient level, i.e. greater than one or more predetermined thresholds, of formatted storage capacity is unseen by the operating systems of the host systems in the SAN infrastructure (step 540). If there is a sufficient level of formatted storage capacity that is unseen by the operating systems of the host systems, then a notification may be automatically generated and sent to a storage capacity administrator to indicate the potential storage waste problem and request that he/she investigate the storage provisioning procedures of the SAN infrastructure (step 550).

Thereafter, the storage management module may initiate monitoring of storage allocations to determine if host systems are not allocating assigned storage space (step 560). If a host system is determined to not be allocating assigned storage space properly (step 570), the storage management module may send a notification to the storage capacity administrator and/or the host system to indicate the problem (step 580). Moreover, automatic mechanisms may be initialized at the host system in response to the receipt of this notification to automatically complete the provisioning steps for allocating the assigned storage space (step 590). Thereafter, or if the result of steps 540 or 570 is "no", the operation then terminates.

Thus, the mechanisms of the illustrative embodiments provide functionality for consolidating and correlating disparate SAN infrastructure metric information into a single view of the storage capacity utilization and waste across the SAN infrastructure. Moreover, the mechanisms of the illustrative embodiments provide special consolidated analysis for determining serious storage waste problems within the SAN infrastructure to thereby initialize corrective actions by sending notifications of the problems to a storage capacity administrator and/or host system in which problems are detected. Moreover, automated mechanisms may be used to correct storage capacity waste based on the special consolidated analysis performed on the single consolidated view of the metric information gathered from across the SAN infrastructure.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for monitoring storage capacity utilization, comprising:
    collecting metric data from a plurality of agents associated with a plurality of storage area network elements;
    consolidating the metric data into a single representation of storage capacity utilization and waste across the entire storage area network; and
    outputting the single representation of storage capacity utilization and waste for use in administering the storage area network.

2. The method of claim 1, further comprising:
    analyzing the single representation of storage capacity utilization and waste to identify storage waste problems in the storage area network; and
    generating and outputting a notification of a storage waste problem in response to results of analyzing the single representation of storage capacity utilization and waste.

3. The method of claim 1, wherein the single representation of storage capacity utilization and waste comprises a hierarchical representation comprising a plurality of layers, wherein the plurality of layers correspond to layers of the storage area network.

4. The method of claim 3, wherein the hierarchical representation is arranged in a pyramidal configuration in which a first layer, at one extreme of the representation, corresponds to basic raw storage capacity of the storage area network and a second layer, at an opposite extreme of the representation, corresponds to a portion of storage capacity used for logical units which comprises files and database data and a portion that is not used by files or database data.

5. The method of claim 4, wherein a third layer, adjacent the first layer, of the hierarchical representation corresponds to a formatted/unformatted storage capacity portion of the basic raw storage capacity of the first layer, and wherein a comparison of the first layer to the third layer identifies an amount of wasted storage capacity due to unformatted storage capacity being present in the storage area network.

6. The method of claim 5, wherein a fourth layer, adjacent the third layer, of the hierarchical representation corresponds to a portion of the formatted capacity in the third layer that is allocated to logical units and a portion of the formatted capacity in the third layer that is unallocated to logical units is represented, such that a comparison of the fourth layer to the third layer identifies an amount of wasted storage capacity due to formatted capacity not being allocated to logical units.

7. The method of claim 6, wherein a fifth layer, adjacent the fourth layer, of the hierarchical representation corresponds to a portion of the formatted storage capacity allocated to logical units in the fourth layer, which is actually assigned to data processing devices or fabric adapters and a portion of the formatted storage capacity which are unassigned to data processing devices or fabric adapters, such that a comparison of the fifth layer to the fourth layer identifies an amount of wasted storage capacity due to the formatted storage capacity allocated to logical units being unassigned to data processing devices or fabric adapters.

8. The method of claim 7, wherein a sixth layer, adjacent the fifth layer, of the hierarchical representation corresponds to a portion of storage capacity of assigned logical units that is actually assigned to operating systems and a portion of the storage capacity of the assigned logical units that is not assigned to the operating systems, such that a comparison of the sixth level with the fifth level identifies an amount of storage capacity assigned to logical units that is wasted storage capacity due to the storage capacity not being assigned to the operating systems.

9. The method of claim 8, wherein a seventh layer, adjacent the sixth layer, of the hierarchical representation corresponds to a portion of the logical unit storage capacity, assigned to an operating system, which is used for logical partitions in a storage subsystem and a portion of unused Physical Partitions (PPs) and unused hard disks, such that a comparison of the seventh layer to the sixth layer identifies an amount of wasted storage capacity due to unused PPs and unused hard disks.

10. The method of claim 3, wherein the metric data is gathered from a plurality of storage area network components including at least one of applications, file systems, operating systems, databases, networking devices, storage subsystems, or storage volumes, and wherein the plurality of layers of the hierarchical representation are represented using a proportional sizing and emphasis of wasted storage capacity in the representation.

11. The method of claim 2, wherein analyzing the single representation of storage capacity utilization and waste to identify storage waste problems in the storage area network comprises analyzing the single representation of storage capacity utilization for a formatted wasted space condition in which storage subsystem volumes have been formatted at the storage subsystem level and assigned to at least one host system, but are not allocated by an operating system on the at least one host system.

12. The method of claim 11, wherein analyzing the single representation of storage capacity utilization and waste for the formatted wasted space condition comprises generating a ratio of an amount of logical unit storage capacity not allocated by the operating system on the at least one host system to an amount of storage capacity allocated by the operating system.

13. The method of claim 12, wherein analyzing the single representation of storage capacity utilization and waste for the formatted wasted space condition further comprises at least one of determining a number of the at least one host system on which there are assigned volumes that are not allocated by the operating system of the at least one host system or determining a total amount of assigned and unused logical unit storage capacity that exists for all of the at least one host system.

14. The method of claim 11, wherein generating and outputting the notification of the storage waste problem is performed in response to a measure of the formatted wasted space condition being greater than a predetermined threshold.

15. The method of claim 2, wherein analyzing the single representation of the storage capacity utilization and waste further comprises determining a correlated capacity efficiency rating for the storage area network.

16. The method of claim 1, further comprising:
monitoring the storage area network for a new storage assignment operation in a storage subsystem of the storage area network;
monitoring at least one host system of the storage area network for performance of an allocation operation within a predetermined period of time from the new storage assignment operation; and
performing, in response to determining that the allocation operation is not performed within the predetermined period of time, at least one of generating a notification or automatically initiating the allocation operation of the at least one host system.

17. A computer program product comprising a computer useable medium having a computer readable program, wherein the computer readable program, when executed on a computing device, causes the computing device to:
collect metric data from a plurality of agents associated with a plurality of storage area network elements;
consolidate the metric data into a single representation of storage capacity utilization and waste across the entire storage area network; and
output the single representation of storage capacity utilization and waste for use in administering the storage area network, wherein the single representation of storage capacity utilization and waste comprises a hierarchical representation comprising a plurality of layers, wherein the plurality of layers correspond to layers of the storage area network.

18. The computer program product of claim 17, wherein the computer readable program further causes the computing device to:
analyze the single representation of storage capacity utilization and waste to identify storage waste problems in the storage area network; and
generate and output a notification of a storage waste problem in response to results of analyzing the single representation of storage capacity utilization and waste.

19. A data processing system, for monitoring storage capacity utilization, comprising:
a storage management module; and
a plurality of agents, associated with a plurality of storage area network elements, and coupled to the storage management module, wherein the storage management module:
collects metric data from the plurality of agents,
consolidates the metric data into a single representation of storage capacity utilization and waste across the entire storage area network, and
outputs the single representation of storage capacity utilization and waste for use in administering the storage area network, and wherein the single representation of storage capacity utilization and waste comprises a hierarchical representation comprising a plurality of layers, wherein the plurality of layers correspond to layers of the storage area network.

20. The system of claim 19, wherein the storage management module further:
analyzes the single representation of storage capacity utilization and waste to identify storage waste problems in the storage area network, and
generates and outputs a notification of a storage waste problem in response to results of analyzing the single representation of storage capacity utilization and waste.

* * * * *